United States Patent Office 3,846,241
Patented Nov. 5, 1974

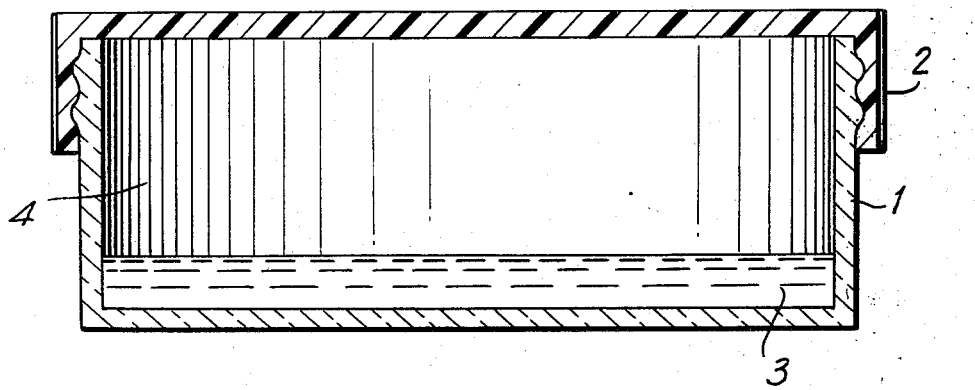

3,846,241
MEDIUM FOR NEISSERIA AND METHOD OF CULTIVATING NEISSERIA
Yvonne Constance Faur, 2385 Grand Ave., Bronx, N.Y. 10468; Martin Harold Weisburd, 82—40 Austin St., Kew Gardens, N.Y. 11415; Marion Evans Wilson, 155 W. 68th St., New York, N.Y. 10023; and Paul S. May, 23 Fairview Lane, Orangeburg, N.Y. 10962
Filed Oct. 10, 1972, Ser. No. 296,253
Int. Cl. C12k 1/10
U.S. Cl. 195—100
17 Claims

ABSTRACT OF THE DISCLOSURE

The invention relates to a medium for Neisseria and method of cultivating the same, and more particularly to a medium and method which permits the primary isolation of N. gonorrhoeae and N. meningitidis, the two fastidious pathogenic species of the Neisseria genus. By the incorporation into a nutrient medium for Neisseria of a yeast dialysate it is possible to obtain rapid and luxuriant growth of Neisseria both in a laboratory in an incubator into which a carbon dioxide atmosphere is introduced or in a transportable container in which the carbon dioxide atmosphere for promoting the growth of Neisseria is produced by the medium itself as the Neisseria grows. By the use of selected antibiotics which are active against organisms other than pathogenic Neisseria but not active against the pathogenic Neisseria it is possible to obtain selective growth of the pathogenic Neisseria.

BACKGROUND OF THE INVENTION

The need for developing means for rapid and accurate cultivation and primary isolation of the pathogenic species of Neisseria genus, namely N. gonorrhoeae and N. meningitidis has greatly increased in recent years. Improvements are necessary both in laboratory procedures for large scale operation, and in procedures which permit the culturing and incubation in a transportable container for use in physicians' offices and clinics.

SUMMARY OF THE INVENTION

Generally speaking, in accordance with the invention, there is provided a nutrient medium for Neisseria genus and including yeast dialysate. The incorporation of the yeast dialysate in the nutrient medium for the Neisseria greatly improves the speed and luxury of growth of the Neisseria, and in addition results in the production of carbon dioxide during the incubation so that by the use of a closed container with this nutrient medium including the yeast dialysate therein the carbon dioxide atmosphere is produced by the medium which provides for better growth of the Neisseria.

It is accordingly a primary object of the present invention to provide a medium for improved culturing of pathogenic Neisseria, both with respect to speed and luxury of growth.

It is another object of the present invention to provide a medium and means for culturing of the Neisseria which permits primary isolation of the pathogenic species of the Neisseria genus.

It is yet a further object of the present invention to provide for a composition and means for the growth and transportation of a culture of Neisseria.

Other objects and advantages of the present invention will be apparent from a further reading of the specification and of the appended claims.

With the above and other objects in view, the present invention mainly comprises a medium for culturing pathogenic Neisseria comprising a nutrient for Neisseria and yeast dialysate which promotes improved growth of the Neisseria.

In accordance with the preferred embodiment of the present invention the medium also includes an antibiotic composition which acts against bacteria other than the pathogenic species of the Neisseria genus.

BRIEF DESCRIPTION OF THE DRAWING

For a fuller understanding of the invention, reference is had to the following description taken in connection with the accompanying drawing, in which the figure is a schematic representation in cross section of a transportable container for the culturing of Neisseria in accordance with the present invention.

DESCRIPTION OF PREFERRED EMBODIMENTS

Referring now to the figure, there is schematically illustrated in cross section a glass or plastic vessel or jar 1 provided with a screw cap 2. Inside the vessel 1 is located a medium 3 according to the present invention, preferably such as that described in Example 3 or Example 4 below, there being a space 4 in the vessel. When a culture is taken the screw cap 2 is opened and the culture applied to the medium 3. The screw cap 2 is then closed. The jar is then incubated and during the incubation and growth of the culture carbon dioxide is evolved from the medium 3 into the space 4. This carbon dioxide provides the atmosphere for the growth of the Neisseria.

The medium of the present invention provides many advantages as a result of its being rich in supplemental growth factors which permit rapid (within 24 hours) and luxuriant growth of the pathogenic Neisseria. It is also highly selective in suppressing the growth of other organisms due to the antibiotics that are present. Furthermore, the medium is clear, its translucency being of great advantage in rapid identification of the organisms growing in the medium. The agar content is preferably adjusted to provide firm gel strength and to maintain its physical integrity when handled or transported. Thus, the medium is highly suitable for use in mass screening for the culture detection of gonorrhea, due to its following advantageous properties:

1. Speed and luxury of growth,
2. selectivity,
3. translucency, and
4. gel strength.

In clinical field trials, the medium of the present invention has been tested against standard Thayer-Martin medium on 1000 patients clinically suspected of having gonorrhea, and against Transgrow medium on more than 2000 patients. In these studies, each specimen taken from each patient was inoculated on paired media being tested. The results indicated the medium of the present invention to be superior to both Thayer-Martin and Transgrow in terms of recoveries of N. gonorrhoeae as well as of incidence and degree of contamination.

Where the medium of the present invention is used in closed vessels such as shown in the drawing herein, wherein the ambient carbon dioxide atmosphere is produced by the medium, then the yeast dialysate should not be autoclaved because the autoclaving destroys some of the components of the yeast dialysate that are necessary for the production of the carbon dioxide. In such case the yeast dialysate is simply sterilized by filtration. On the other hand, although yeast dialysate sterilized by filtration can be used for a medium which is distributed in open Petri plates which are incubated under a carbon dioxide atmosphere, then the yeast dialysate may be autoclaved. Either in autoclaved condition or simply sterilized by filtration, the yeast dialysate in the medium of the present invention provides for improved growth of the Neisseria. In the non-autoclaved conditions, that is in the condition of simple sterilization by filtration, the yeast dialysate provides the additional advantage of producing a carbon dioxide atmosphere in a closed vessel so that it is not necessary to carry out the incubation in an atmosphere wherein carbon dioxide is produced from the outside.

The mediums of the present invention contain two basic components and preferably include a third component. The two basic components are (1) the nutrient and (2) the yeast dialysate. The third component which is preferably included in the medium is (3) an antibiotic composition which is active against other organisms than the pathogenic Neisseria N. gonorrhoease and N. meningitidis so that this antiboitic composition permits selective growth of the N. gonorrhoeae and/or N. meningitidis.

The nutrient for the Neisseria should of course include agar and may also include other nutrients and essential factors such as corn starch proteose peptone, dextrose, homoglobin solution and horse plasma.

Although the nutrient may include agar, corn starch, proteose peptone, dextrose, hemoglobin, and horse plasma, for production purposes it is necessary to separately prepare a basal medium of the agar, corn starch and proteose peptone and a supplemental medium of the yeast dialysate, dextrose, hemoglobin and horse plasma, and to mix these two components together to obtain the nutrient medium with the yeast dialysate. The antibiotic composition may be included in the supplement with the yeast dialysate, dextrose, hemoglobin and horse plasma, and this supplement mixed with the basal medium in order to provide a medium which not only promotes the growth of pathogenic Neisseria but also inhibits the growth of other organisms.

The basal medium may also contain phosphate buffers, e.g. dipotassium phosphate and monopotassium phosphate as well as sodium chloride and water. The pH of the basal medium is adjusted so as to be approximately neutral, e.g. a final pH of $7.1 \pm 0.1$.

The antibiotic composition which is included in the medium of the present invention for selective growth of the pathogenic Neisseria preferably consists of a mixture of vanocomycin, colistin, trimethoprim lactate and either nystatin or amphotericin B.

For the preparation of 1 liter of medium, the following are the preferred proportions:

Agar _____ 10–25 g., preferably 20 g.
Corn Starch _____ 0.5–2.0 g., preferably 1 g.
Proteose peptone #3 _____ 10–20 g., preferably 15 g.
Horse plasma (citrated) __ 100–150 ml., preferably 120 ml.
Hemoglobin solution _____ 200 ml. of 2–6% RBC, preferably 3% RBC.
50% Dextrose solution ____ 2–15 ml., preferably 10 ml.

Yeast dialysate (from about 900 g. yeast and 2,500 ml. distilled water) 10–60 ml., preferably 25 ml. (autoclaved) 50 ml. if filtered.

Antibiotic composition 2–10 ml. utilizing preferably the following antibiotics in the proportions indicated:

Vancomycin _____ 3 µg./ml.
Colistin _____ 7.5 µg./ml.
Trimethoprim lactate _____ 3 µg.–10 µg./ml.
Nystatin _____ 12.5–25 units/ml.
Amphotericin B _____ 0.5 µg.–2 µg./ml.

The following examples are given to further illustrate the present invention. The scope of the invention is not, however, meant to be limited to the specific details of the examples.

EXAMPLE 1

Ingredients for the preparation of 1 liter of medium

I. *Preparation of basal medium*
  A. Agar: 20 g. in 400 ml. distilled water. The solution is placed in an Arnold oven until melted.
  B. Corn starch: 1 g. in 40 ml. distilled water. The solution is first mixed on a magnetic stirrer and then placed in the Arnold until homogeneous.
  C. Proteose peptone #3 15 g.; Dipotassium phosphate 4 g.; Monopotassium phosphate 1 g.; Sodium chloride 5 g.; Distilled water 200 ml. Bring the components of "C" to boiling on a heated magnetic stirrer.
  D. Add melted agar, corn starch and proteose peptone solution and mix thoroughly on a heated magnetic stirrer.
  E. Autoclave 15 min./15 lbs./121° C.
  F. Allow to cool and store at 4° C.
  G. Final pH $7.1 - \pm 0.1$ II. *Preparation of Supplement*
  A. Yeast dialysate: Baker's yeast (Fleischmann) 908 g.; Distilled $H_2O$ 2,500 ml.

Carefully mix the yeast to a smooth paste and autoclave 10' and allow to cool. Place in dialysis tubing and dialyze against 2 liters of distilled $H_2O$ in the cold for 48 hrs. Dialysate is collected and dispensed in 10 ml. aliquot in screw cap tubes and autoclaved 15/15/121° C. The yeast dialysate is stored at −20° C.

B. 50% dextrose solution distributed in 4 ml. aliquots. Autoclave 10/10/115.2° C.
  C. 3% hemoglobin solution is prepared from packed horse red blood cells.
  D. Horse plasma (citrated).
  E. Antibiotic mixture: Vancomycin=3 µg./ml.; Colistin=7.5 µg./ml.; Nystatin=12.5 units/ml.; Trimethoprim lactate=3 µg./ml.

1. Melt basal medium and allow to cool in a 55° C. water bath.
2. The following additions are made for 1 liters of final medium:

a. 120 ml. plasma
b. 200 ml. of a 3% RBC (hemolyzed)
c. 10 ml. 50% dextrose solution
d. 25 ml. yeast dialysate
e. 5 ml. antibiotic mixture 3. After the addition of the supplement to the basal medium, plates are poured and allowed to dry.

The above medium is for use in plates which are incubated under increased $CO_2$ tension. The medium is translucent, has a high gel strength and is selective for rapid and luxurious growth of N. gonorrhoeae and N. meningitidis.

EXAMPLE 2

Ingredients for the preparation of 1 liter of medium

I. *Preparation of basal medium*
  A. Agar: 20 g. in 400 ml. distilled water. The solution is placed in an Arnold until melted.

B. Corn starch: 1 g. in 40 ml. distilled water. The solution is first mixed on a magnetic stirrer and then placed in the Arnold until homogeneous.

C. Proteose peptone #3, 15 g.; Dipotassium phosphate, 4 g.; Monopotassium phosphate, 1 g.; Sodium chloride, 5 g.; Distilled water, 200 ml. Bring the components of "C" to boiling on a heated magnetic stirrer.

D. Add melted agar, corn starch and proteose peptone solution and mix thoroughly on a heated magnetic stirrer.

E. Autoclave 15/15/121° C.

F. Allow to cool and store at 4° C.

G. Final pH 7.1±0.1.

II. *Preparation of Supplement*

A. Yeast dialysate: Bakers' yeast (Fleischmann), 908 g.; Distilled $H_2O$, 2,500 ml.

Carefully mix the yeast to a smooth paste and autoclave at 5 p.s.i. for 10' and allow to cool. Place in dialysis tubing and dialyze against 2 liters of distilled $H_2O$ in the cold for 48 hrs. Dialysate is collected and dispensed in 10 ml. aliquots in screw cap tubes and autoclaved 15/15/121° C. The yeast dialysate is stored at −20° C.

B. 50% dextrose solution distributed in 4 ml. aliquots. Autoclave 10/10/115.2° C.

C. 3% hemoglobin solution is prepared from packed horse red blood cells.

D. Horse plasma (citrated).

E. Antibiotic mixture: Vancomycin=3 µg./ml.; Colistin=7.5 µg./ml.; Amphotericin B=2 µg./ml.; Trimethoprim lactate=3 µg./ml.

1. Melt basal medium and allow to cool in a 55° C. water bath.

2. The following additions are made for 1 liter of final medium:

a. 120 ml. plasma
b. 200 ml. of a 3% RBC (hemolyzed)
c. 10 ml. of 50% dextrose solution
d. 25 ml. yeast dialysate
e. 5 ml. antibiotic.

3. After the addition of the supplement to the basal medium, plates are poured and allowed to dry.

The above medium is for use in plates which are incubated under increased $CO_2$ tension. The medium is translucent, has a high gel strength and is selective for rapid and luxurious growth of *N. gonorrhoeae* and *N. meningitidis*.

The following examples illustrate mediums which will support the survival and growth of pathogenic Neisseria in transport. In this form the medium is provided in closed containers such as screw capped plates, screw capped glass prescription bottles, e.g. 1 oz. or 2 oz., plastic tissure culture flasks provided with a screw cap, and screw capped tubes. The basic difference in the medium is that the yeast dialysate is not sterilized by autoclaving but rather by filtration. It should be noted that while only these mediums can be used for supporting the survival and growth of the pathogenic Neisseria in transport, they can also be used for Petri plates and the like which are incubated under increased $CO_2$ tension.

The mediums of the present invention which are provided inclosed containers are different from those of the commercially available transport media such as those sold under the trade names of Transgrow and Clinicult.

The pathogenic Neisseria have an absolute requirement for 5–10% $CO_2$ for initial growth. In the Transgrow system, a $CO_2$ atmosphere is provided by placing the glass prescription bottles containing solidified medium upright in a vacuum jar, partially exhausting the air with a vacuum pump, and refilling the chamber with a mixture of 10% $CO_2$ and 90% filtered air until the chamber returns to atmospheric pressure. Screw caps are then tightly fastened. When a culture is made, the bottle is maintained in an upright position, the screw cap is opened, the culture applied, and the screw cap immediately closed. Because carbon dioxide is heavier than air, if this is done sufficiently rapidly, carbon dioxide does not escape and there should be sufficient carbon dioxide in the atmosphere of the closed bottle for the culturing. However, extreme care must be taken in the making of the culture since otherwise the carbon dioxide atmosphere can be lost and the culture might be inaccurate.

In the Clinicult system, a carbonate pellet is introduced into a screw capped tube and then the agar medium which is located on a stick after being contacted with the material to be cultured is placed in the tube. Thus the carbon dioxide atmosphere is generated by means of the carbonate pellet.

In contrast thereto, the medium compositions of the present invention themselves provide for carbon dioxide development and release. The medium is packed in a closed vessel, and as it supports the growth of pathogenic Neisseria, carbon dioxide is generated and the required concentration is maintained within the vessel. This obviates the need for providing exogenous $CO_2$ in the ambient atmosphere, and greatly simplifies the preparation of bottled tubed media. Furthermore, it eliminates the logistically difficult problem of providing exogenous $CO_2$ during transport and/or incubation of inoculated plated media.

Together with the rich growth factors present, and the selectivity of the antibiotic mixture, the generation of the required $CO_2$ from the medium greatly increases the total recovery of *N. gonorrhoeae* and *N. meningitidis* from screened patients.

EXAMPLE 3

Ingredients for the preparation of 1 liter of medium

I. *Preparation of basal medium*

A. Agar: 20 g. in 400 ml. distilled water. The solution is placed in an Arnold until melted.

B. Corn starch: 1 g. in 40 ml. distilled water. The solution is first mixed on a magnetic stirrer and then placed in the Arnold until homogeneous.

C. Proteose peptone #3 15 g.; Dipotassium phosphate 4 g.; Monopotassium phosphate 1 g.; Sodium chloride 5 g.; Distilled water 175 ml. Bring the components of "C" to boiling on a heated magnetic stirrer.

D. Add melted agar, corn starch and proteose peptone solution and mix thoroughly on a heated magnetic stirrer.

E. Autoclave 15/15/121° C.

F. Allow to cool and store at 4° C.

G. Final pH 7.1±0.1.

II. *Preparation of Supplement*

A. *Yeast dialysate:* Bakers' yeast (Fleischmann) 908 g.; Distilled $H_2O$ 2,50 ml.

Carefully mix the yeast to a smooth paste and autoclave at 5 p.s.i. for 10' and allow to cool. Place in dialysis tubing and dialyze against 2 liters of distilled $H_2O$ in the cold for 48 hrs. Dialysate is collected, sterilized by filtration through a millipore filter and dispensed in 20 ml. aliquots in screw capped tubes. Tubes with yeast dialysate are stored at −20° C.

B. 50% dextrose solution distributed in 4 ml. aliquots. Autoclave 10/10/115.2° C.

C. 3% hemoglobin solution is prepared from packed horse red blood cells.

D. Horse plasma (citrated).

E. Antibiotic mixture: Vancomycin=µg./ml.; Colistin =7.5 µg./ml.; Nystatin=12.5 units/ml.; Trimethoprim lactate=3 µg./ml.

1. Melt basal medium and allow to cool in a 55° C. water bath.

2. The following additions are made for 1 liter of final medium:
a. 120 ml. plasma
b. 200 ml. of a 3% RBC (hemolyzed)
c. 10 ml. 50% dextrose solution
d. 50 ml. yeast dialysate
e. 5 ml. antibiotic mixture.

3. After the addition of the supplement to the basal medium, medium is poured into closed containers and allowed to dry.

This medium packed in the closed container can be used for the culturing of pathogenic Neisseria in transport because the carbon dioxide atmosphere is produced in the closed container by the medium.

EXAMPLE 4

Ingredients for the preparation of 1 liter of medium

I. *Preparation of basal medium*
A. Agar: 20 g. in 400 ml. distilled water. The solution is placed in an Arnold until melted.
B. Corn starch: 1 g. in 40 ml. distilled water. The solution is first mixed on a magnetic stirrer and then placed in the Arnold until homogeneous.
C. Proteose peptone #3 15 g.; Dipotassium phosphate 4 g.; Monopotassium phosphate 1 g.; Sodium chloride 5 g.; Distilled water 175 ml. Bring the components of "C" to boiling on a heated magnetic stirrer.
D. Add melted agar, corn starch and proteose peptone solution and mix thoroughly on a heated magnetic stirrer.
E. Autoclave 15/15/121° C.
F. Allow to cool and store at 4° C.
G. Final pH 7.1±0.1.

II. *Preparation of Supplement*
A. Yeast Dialysate: Bakers' yeast (Fleischmann) 908 g. Distilled $H_2O$: 2,50 ml.

Carefully mix the yeast to a smooth paste and autoclave at 5 p.s.i. for 10' and allow to cool. Place in dialysis tubing and dialyze against 2 liters of distilled $H_2O$ in the cold for 48 hrs. Dialysate is collected, sterilized by filtration through a millipore filter and dispensed in 20 ml. aliquots in screw capped tubes. Tubes with yeast dialysate are stored at —20° C.

B. 50% dextrose solution distributed in 4 ml. aliquots. Autoclave 10/10/115.2° C.
C. 3% hemoglobin solution is prepared from packed horse red blood cells.
D. Horse plasma (citrated).
E. Antibiotic mixture: Vancomycin=3 μg./ml.; Colistin=7.5 μg./ml.; Amphotericin B=1.0 μg./ml.; Trimethoprim lactate=3μg./ml.

1. Melt basal medium and allow to cool in a 55° C. water bath.
2. The following additions are made for 1 liter of final medium:
a. 120 ml. plasma
b. 200 ml. of a 3% RBC (hemolyzed)
c. 10 ml. 50% dextrose solution
d. 50 ml. yeast dialysate
e. 5 ml. antibiotic mixture.

3. After the addition of the supplement to the basal medium, medium is poured into closed containers and allowed to dry.

This medium packed in the closed container can be used for the culturing of pathogenic Neisseria in transport because the carbon dioxide atmosphere is produced in the closed container by the medium.

Thus, it is apparent that the mediums of the present invention provide the following features and advantages:

1. The mediums contain a filtered or autoclaved yeast dialysate as a source of essential factors that promote rapid and luxuriant growth of pathogenic Neisseria, including the most fastidious strains that fail to grow on other available media. The filtered yeast dialysate in the medium composition may be used either in open containers or closed containers with the open containers incubated under outside $CO_2$ tension. On the other hand, the autoclaved yeast dialysate can only be used where the incubation is carried out under outside increased $CO_2$ tension.

2. The mediums can be packaged in any of a variety of closed containers to permit the growth of pathogenic Neisseria without the necessity for adding exogenous $CO_2$.

3. The compositions can be formulated with amphotericin or with nystatin, and it is possible to substitute the amphotericin for the nystatin as an antifungal agent. The amphotericin substantially increases the selectivity of the medium inhibiting the growth of yeast and mold contaminants.

4. The mediums due to their formulation, selectivity, translucence and gel strength are ideal for the isolation of *N. gonorrhoeae*.

While the invention has been described in particular with respect to specific examples of mediums, it is apparent that variations and modifications can be made without departing from the spirit or scope of the invention.

What is claimed is:

1. Medium for the selective culturing of pathogenic Neisseria which comprises a nutrient for Neisseria yeast dialysate and including an antibiotic composition active against organisms other than pathogenic Neisseria and being selected from the group consisting of nystatin, amphotericin B, a mixture of vancomycin, colistin, nystatin and trimethoprim lactate and a mixture of vancomycin, colistin, amphotericin B and trimethoprim lactate.

2. Medium according to claim 1 wherein said antibiotic composition includes nystatin.

3. Medium according to claim 1 wherein said antibiotic composition includes amphotericin B.

4. Medium according to claim 1 wherein said antibiotic composition consists essentially of a mixture of vancomycin, colistin, nystatin and trimethoprim lactate.

5. Medium according to claim 1 wherein said antibiotic composition consists essentially of a mixture of vancomycin, colistin, amphotericin B and trimethoprim lactate.

6. Medium according to claim 1 wherein said yeast dialysate is sterilized by autoclaving.

7. Method of growing Neisseria which comprises culturing Neisseria on the medium of claim 6 under a carbon dioxide atmosphere.

8. Method of selectively growing pathogenic Neisseria, which comprises culturing the Neisseria on the medium of claim 1 under a carbon dioxide atmosphere.

9. Medium for culturing Neisseria comprising a nutrient for Neisseria and including yeast dialysate wherein said yeast dialysate is sterilized by filtration, whereby the components of the yeast dialysate necessary for the production of $CO_2$ remain intact so that upon culturing of Neisseria with said medium $CO_2$ is produced and promotes growth of the Neisseria.

10. Container and medium for transport and growth of Neisseria, comprising a container provided with a closure means, and the medium of claim 9 located in but not filling said container leaving a space in said container above said medium so that upon culturing of Neisseria in the closed vessel a $CO_2$ atmosphere is formed which promotes the growth of the Neisseria.

11. Container and medium according to claim 10 for the selective culturing of pathogenic Neisseria and also including an antibiotic composition which is active against organisms other than pathogenic Neisseria.

12. Method of growing Neisseria which comprises culturing Neisseria in a closed vessel containing the medium of claim 9, whereby a carbon dioxide atmosphere is formed in the closed vessel as the Neisseria grows.

13. Method according to claim 12 for the selective growth of pathogenic Neisseria wherein said medium includes an antibiotic composition which is active against organisms other than pathogenic Neisseria.

14. Method according to claim 13 wherein said antibiotic composition includes nystatin.

15. Method according to claim 13 wherein said antibiotic composition includes amphotericin B.

16. Method according to claim 13 wherein said antibiotic composition consists essentially of a mixture of vancomycin, colistin, nystatin and trimethoprim lactate.

17. Method according to claim 13 wherein said antibiotic composition consists essentially of a mixture of vancomycin, colistin, amphotericin B and trimethoprim lactate.

References Cited

UNITED STATES PATENTS 3,715,281   2/1973   Martin et al. _____ 195—100

OTHER REFERENCES

BBL Manual of Products, p. 163, 5th ed. 1968.

A. LOUIS MONACELL, Primary Examiner

R. J. WARDEN, Assistant Examiner

U.S. Cl. X.R.

195—102